United States Patent
Zanaty

(10) Patent No.: US 7,974,248 B2
(45) Date of Patent: Jul. 5, 2011

(54) WIRELESS "WHOOPER" SYSTEM FOR CONSOLIDATING WIRELESS COMMUNICATION ACCESS POINTS AND CLIENT STATIONS AND PROVIDING DIFFERENTIATED WIRELESS SERVICES

(75) Inventor: Farouk M. Zanaty, Palm Bay, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 1245 days.

(21) Appl. No.: 11/137,412

(22) Filed: May 26, 2005

(65) Prior Publication Data
US 2006/0268793 A1    Nov. 30, 2006

(51) Int. Cl.
*H04L 12/40* (2006.01)

(52) U.S. Cl. ........ 370/338; 370/208; 370/437; 370/443; 709/239

(58) Field of Classification Search .................. 370/338, 370/208, 437, 443, 230; 725/105; 709/239
See application file for complete search history.

(56) References Cited

U.S. PATENT DOCUMENTS

| | | | |
|---|---|---|---|
| 6,618,593 B1 * | 9/2003 | Drutman et al. ........... | 455/456.3 |
| 6,628,629 B1 * | 9/2003 | Jorgensen .................. | 370/322 |
| 7,020,081 B1 * | 3/2006 | Tani et al. .................. | 370/230 |
| 2003/0217368 A1 * | 11/2003 | Ramaswamy ................ | 725/131 |
| 2004/0081134 A1 * | 4/2004 | Kotzin ......................... | 370/348 |
| 2005/0094557 A1 * | 5/2005 | Chen et al. .................. | 370/229 |
| 2005/0125836 A1 * | 6/2005 | Estevez et al. ................ | 725/105 |
| 2005/0135372 A1 * | 6/2005 | Cromer et al. ............. | 370/395.2 |
| 2005/0265298 A1 * | 12/2005 | Adachi et al. ................ | 370/338 |
| 2008/0016222 A1 * | 1/2008 | Ihara et al. ................... | 709/226 |

* cited by examiner

*Primary Examiner* — Huy Phan
*Assistant Examiner* — Julio Perez
(74) *Attorney, Agent, or Firm* — Matthew A. Pequignot; Pequignot + Myers LLC

(57) ABSTRACT

A Wireless Whooper system for use in wireless networks is provided with a collection of wireless client stations arranged to transmit and receive wireless streams of information, and wireless Access Points (APs) arranged to wirelessly link with the wireless client stations, each supporting a group of wireless client stations; and a supervisory processing unit (SPU) arranged to monitor and dynamically switch between available wireless APs, forward and transmit streams of information through the wireless networks. Such a supervisory processing unit (SPU) can be installed as a separate control device or integrated within each wireless AP to handle the dynamic switching and routing of streams of information between available wireless APs within the system. This way the Wireless Whooper system can advantageously provide high quality differentiated wireless services and capabilities to dynamically change a single wireless traffic stream between any single source and destination to multiple streams via other existing wireless elements (e.g., wireless Access Points "APs" and client stations).

17 Claims, 12 Drawing Sheets

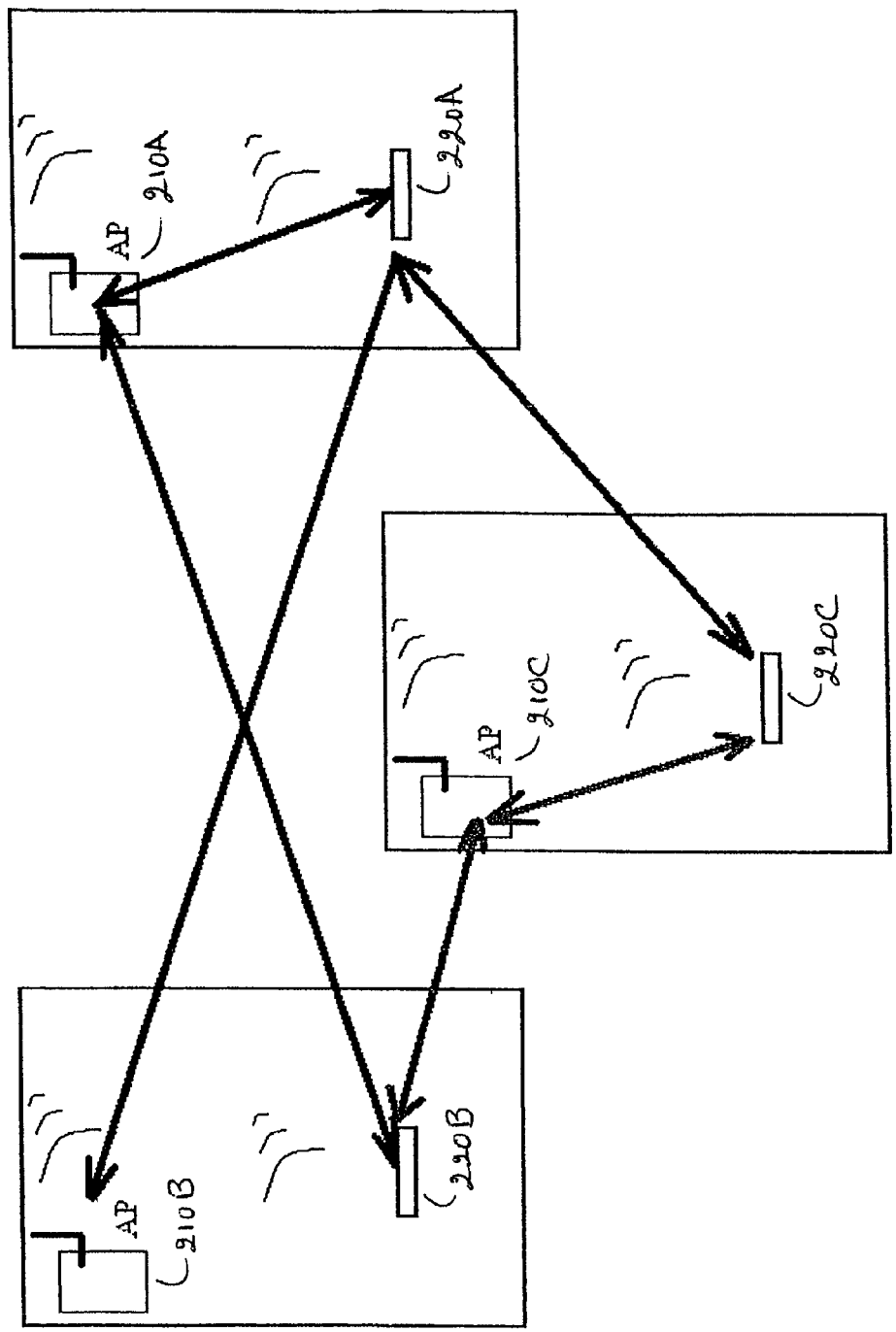

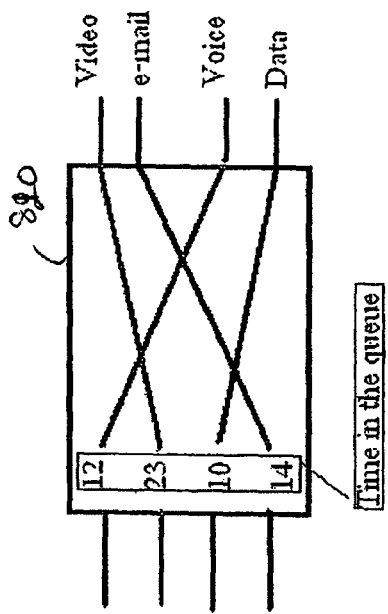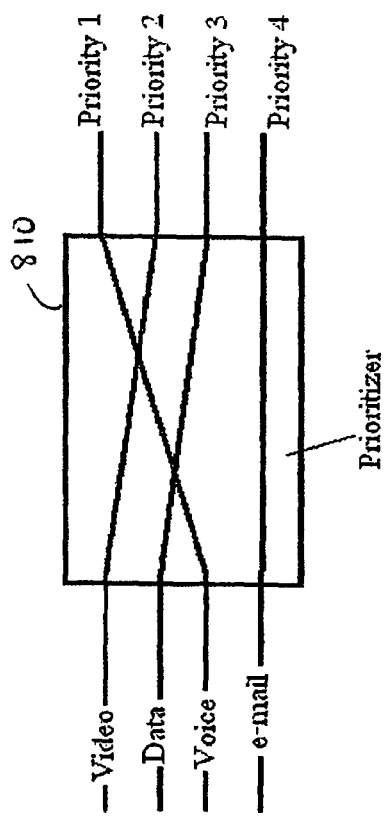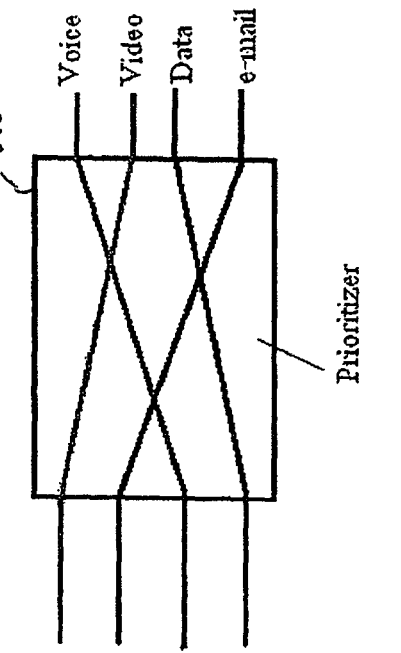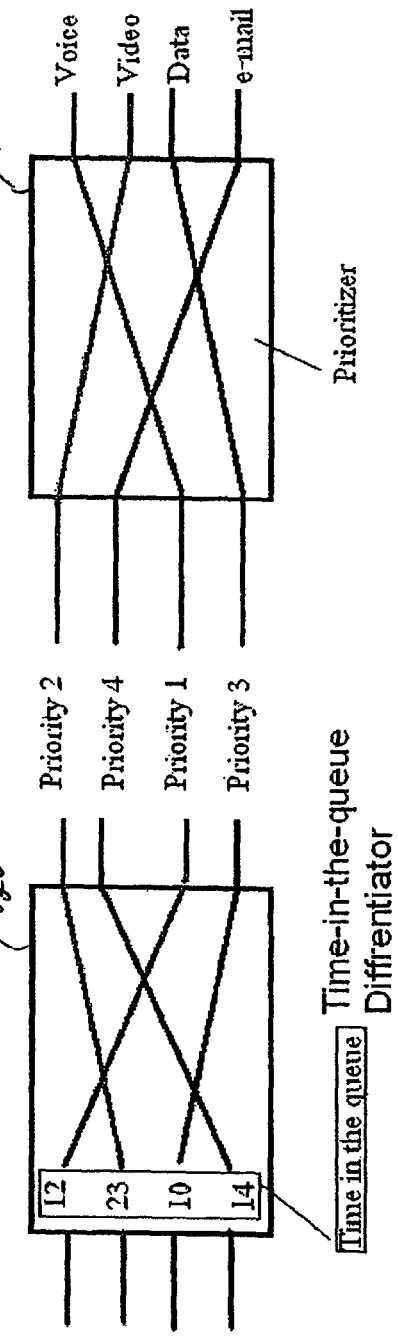

Switching from Infrastructure to Ad-Hoc mode

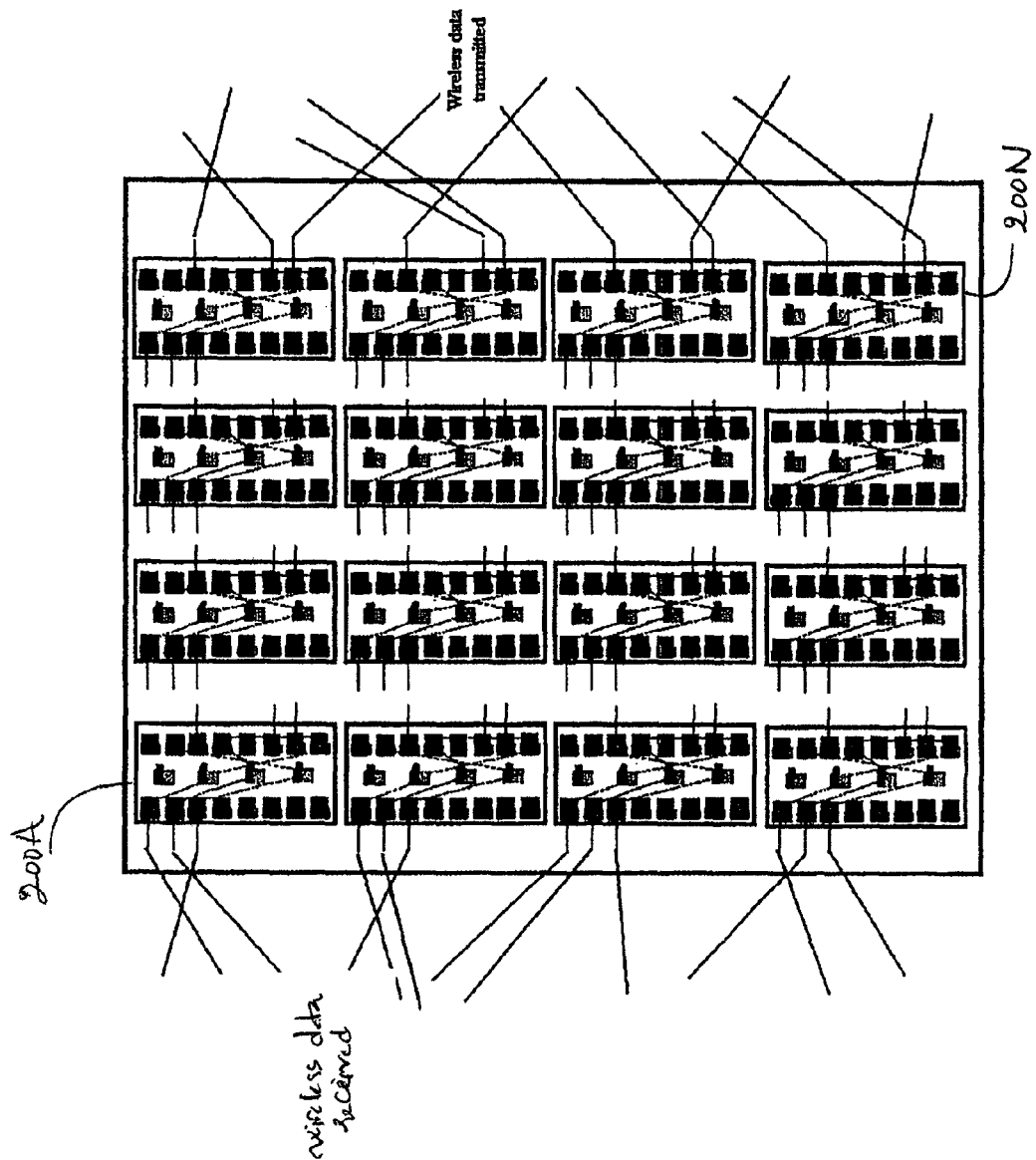

WIRELESS "WHOOPER" SYSTEM FOR CONSOLIDATING WIRELESS COMMUNICATION ACCESS POINTS AND CLIENT STATIONS AND PROVIDING DIFFERENTIATED WIRELESS SERVICES

BACKGROUND

Existing wireless networks, as shown in FIG. 1, typically include a distribution system 110 which serves as a backbone wired local area network (LAN), such as Ethernet that supports servers 120A-120N and one or more bridges or routers (not shown) to link with other networks, including, for example, the Internet, and one or more control modules, known as wireless Access Points (APs) 130 arranged at designated locations in the wireless networks, each supporting wireless communication with a number of wireless terminals, also known as "client stations" 140A-140N within its transmission range (service area, typically 300-1000 foot diameter) and providing access to the distribution system 110. The wireless AP 130 is provided to access network resources, via the distribution system 110 such as the Internet (not shown herein, for purposes of simplicity, are the Internet gateway, WAN/LAN interface and local server), while the client stations 140A-140N are provided to communicate with the wireless AP 130, via wireless links, without the needs of expensive dedicated cables or wirings, as specified by standard communication protocols, such as, for example, IEEE 802.11a, 802.11b and/or 802.11g standards for a wireless LAN. In addition to the wireless AP 130 and client stations 140A-140N, there may be one or more hubs or user modules (UMs) 150 which connect a number of workstations 160A-160N in a wired LAN. Radio signals transmitted between the wireless AP 130 and the client stations 140A-140N can be uni-directional or bidirectional in the wireless domain to comply with, for example, frequencies of the 2.4-5 GHz bands as dictated by IEEE 802.11a, 802.11b and/or 802.11g standards for a wireless LAN.

Each of the wireless AP 130 and the client stations 140A-140N is also equipped with a wireless interface provided to perform all functions necessary to transmit and receive information in accordance with IEEE 802.11a, 802.11b and/or 802.11g standards for a wireless LAN. Client stations 140A-140N can share information and access each other in an authenticated manner, via the wireless AP 130. The wireless AP 130 can, in turn, authenticate conforming client stations 140A-140N with the authorized information transmitted, via wireless links. In other configurations, an authentication server may be used to authenticate connectivity between the AP 130 and the client stations 140A-140N. Both the wireless AP 130 and client stations 140A-140N, when relevantly configured, can detect foreign unauthorized wireless elements that try to attack the wireless networks and consequently de-authenticate for security purposes.

However, in such wireless networks, each wireless AP 130 is provided to serve only a fixed number of client stations 140A-140N. All client stations 140A-140N served by the wireless AP 130 must be connected to that wireless AP 130, via wireless links. Likewise, the wireless AP 130 must process requests from one or more client stations 140A-140N in a specific order or priority set in advance according to Quality of Service Qos scheme. For example, if the wireless AP 130 is installed in a private or public space, such as, a hotel, airport, café, or bookstore, to serve users at client stations 140A-140N which can be mobile devices such as laptops, PDAs, cellular phones, or other wireless communication devices, within a designated service area, those client stations 140A-140N must be connected to the wireless AP 130, via wireless links, for bi-directional communication if they are deemed within the designated service area. The wireless AP 130 must then process requests from the client stations 140A-140N and/or other wireless communication devices that are within the designated service area in the order received. Therefore, if multiple users at client stations 140A-140N access the wireless AP 130 at the same time, the bandwidth available is divided amongst the users, such that the transfer rate of information may diminish. In addition, if a user at a client station 140A accesses the Internet, via the wireless AP 130, requesting for voice over IP (VoIP) service with minimum latency, and users at other client stations 140B-140N access the Internet only to download email, for example, the wireless AP 130 must process those requests accordingly without any means to differentiate different types of wireless services available (e.g., voice, video, data, email, etc) and forward differentiated wireless services to any other wireless AP which may sit idle within such wireless networks.

Accordingly, there is a need for a wireless system arrangement which can consolidate all wireless APs and client stations within such wireless networks in a cost effective manner, intelligently differentiate different types of wireless services (e.g., voice, video, data, email, etc), and dynamically change between available wireless APs in such wireless networks for priority routing and forwarding streams of information to provide efficient and intelligent wireless services requested. Also needed is intelligence incorporated into each of the available wireless APs and client stations to enable seamless wireless routing and communications between the available wireless APs and client stations, via wireless links, without interruption and/or delay.

SUMMARY

Various aspects and example embodiments of the present invention advantageously provide a Wireless Whooper system which consolidates a plurality of wireless Access Points (APs) and client stations arranged in various configurations to provide high quality differentiated wireless services and capabilities to dynamically change a single wireless traffic stream between any single source and destination to multiple streams via other existing wireless elements (e.g., wireless Access Points "APs" and client stations), while utilizing all functionalities offered by wireless Access Points (APs) and client stations.

In accordance with an aspect of the present invention, a Wireless Whooper system for use in wireless networks comprises a plurality of wireless client stations arranged to transmit and receive wireless streams of information; one or more wireless Access Points (APs) arranged to wirelessly link with the wireless client stations, each supporting a group of wireless client stations; and a supervisory processing unit (SPU) arranged to monitor and dynamically switch between available wireless APs, forward and transmit streams of information through the wireless networks.

According to an aspect of the present invention, a supervisory processing unit (SPU) is provided with wireless quality of service (QoS) differentiation and traffic forwarding mechanisms to oversee all quality of service (QoS) traffic differentiation, dynamic switching and traffic forwarding between available wireless APs within the system. In addition, the supervisory processing unit (SPU) can also be installed as a separate control device or integrated within each wireless AP to handle the dynamic switching and routing of streams of information between available wireless APs within the system.

The wireless APs and client stations can be configured to operate in an Ad-Hoc mode, where client stations exchange bi-directional traffic between each one and all others without the need of wireless APs, and to operate in an Infrastructure mode, where the client stations exchange bi-directional traffic, via the wireless APs. In addition, the wireless APs and client stations can be arranged in various configurations, including unidirectional, partially meshed, unidirectional fully meshed, bi-directional partially meshed or bi-directionally fully meshed configurations for operation in both the Infrastructure mode (where a group of wireless client stations communicate with one or more wireless APs) and the Ad-Hoc mode (where a group of wireless client stations communicate among themselves). For example, the wireless APs and client stations can be arranged in a Star-Meshed configuration for operation in an Infrastructure mode, where designated wireless client stations send and receive wireless information to and from a single wireless AP. Alternatively, the wireless APs and client stations can also be arranged in a Fully-Meshed configuration for operation in both the Ad-Hoc mode and the Infrastructure mode, where wireless APs and wireless client stations send and receive wireless information to and from each other.

According to another aspect of the present invention, the supervisory processing unit (SPU) can further be configured to dynamically allocate and withdraw designated client stations that receive the wireless information, set priorities and privileges on what wireless streams of information to be transmitted and at what order to and from specific sources and destinations based on differentiated services. This allocation of designated client services may result in different meshed configurations.

The supervisory processing unit (SPU) can further be provided with controllable roaming mechanisms between a particular wireless client station that has traffic to be forwarded to a next service coverage area, and is configured to check available bandwidths, nearest wireless hop among other factors based on traffic priority and direct the roaming between different coverage areas.

In addition, the supervisory processing unit (SPU) can further be configured to forward the wireless streams of information based on different categories of importance, including: (1) Priority and QoS flags; (2) Time in queue; (3) Throughput; (4) Latency at Throughput values; (5) Relative hops based on current transfer point and final destination; and (6) Handoff/Roaming to the most available wireless APs and client stations. For example, the supervisory processing unit (SPU) can be provided with a QoS Differentiating Routing Engine comprising a time-in-queue differentiator and a prioritizer configured to receive wireless streams of information from different wireless networks or from different sources within the system, and route differentiated traffic based on different methods based on: (1) predefined priorities, and (2) an elapsed time in an internal queue which determines the priority of the wireless streams information and, consequently, the order of forwarding the wireless streams of information. Such a QoS Differentiating Routing Engine can also be configured to switch between an Ad-Hoc mode of operation and an Infrastructure mode of operation, depending upon whether wireless client stations communicate among themselves, or via corresponding wireless APs.

In accordance with another aspect of the present invention, a Wireless Whooper system for use in wireless networks comprises a collection of wireless Access Points (APs) and client stations to transmit and receive wireless streams of information; and a supervisory processing unit (SPU) provided in each wireless AP, to monitor and differentiate different types of wireless streams of information, to dynamically switch and forward differentiated streams of information between available wireless APs In accordance with yet another aspect of the present invention, a computer readable medium is provided with a plurality of instructions which, when executed by a wireless Access Point (AP) in a Wireless Whooper system having a collection of wireless APs and wireless client stations, cause the wireless AP to perform the steps of: receiving an incoming wireless stream of information from different wireless networks; differentiating the incoming wireless stream of information as a traffic type including voice, video, data and email; and routing a differentiated traffic based on different categories that include (1) predefined priorities, and (2) an elapse time in an internal queue which determines the priority of wireless streams and the order of forwarding the wireless streams of information. Such predefined priorities may define that a voice traffic has a highest priority, a video traffic has a next highest priority, a data traffic has a higher priority than an e-mail traffic, and the priority of each traffic type determines which wireless stream is to be forwarded to different wireless networks in a specified order.

In addition to the example embodiments and aspects as described above, further aspects and embodiments will be apparent by reference to the drawings and by study of the following descriptions.

BRIEF DESCRIPTION OF THE DRAWING(S)

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 3 illustrates an example interaction, including forwarding traffic between several wireless Access Points (APs) and client stations in an example Wireless Whooper system shown in FIG. 2;

FIGS. 8A-8D illustrate an example differentiation and prioritization of different types of wireless streams (traffic) according to various embodiments of the present invention;

Figure 13:
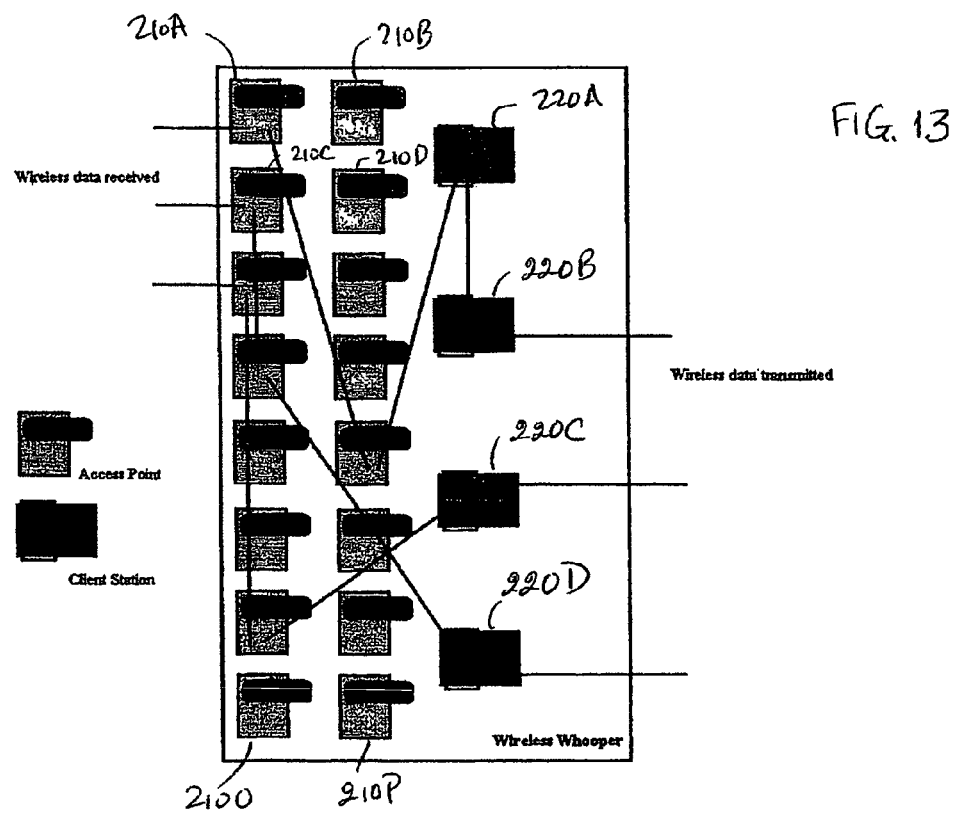

FIG. 13 illustrates an example Wireless Whooper system having a collection of wireless Access Points (APs) and client stations arranged according to yet another embodiment of the present invention; and FIG. 14 illustrates an example arrangement of multiple Wireless Whooper systems each having a collection of wireless Access Points (APs) and client stations arranged according to an example embodiment of the present invention.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/values/ranges may be given, although the present invention is not limited to the same. The present invention is applicable for use with all types of wireless communication devices and wireless networks, including, for example, wireless personal area networks (PANs), wireless local area networks (LANs) such as Wi-Fi networks, Bluetooth, ultra-wideband networks, and wireless metropolitan area networks (MANs) and compatible wireless application protocols usable for wireless transmission as specified by IEEE 802.11a, 802.11b and/or 802.11g standards, Bluetooth standards, other emerging wireless technologies such as Wi-Max, which is a pumped-up version of Wi-Fi and stands for worldwide interoperability for microwave access, where users will be able to access the Internet with wireless cards from within a range of 30 miles rather than 300 feet, at speeds far greater than cable modems, or even mobile cellular networks supporting an even wider range of coverage. However, for the sake of simplicity, discussions will concentrate mainly on exemplary use of several configurations and arrangement systems of wireless Access Points (APs) and client stations in a wireless local area network, although the scope of the present invention is not limited thereto.

Figure 2:
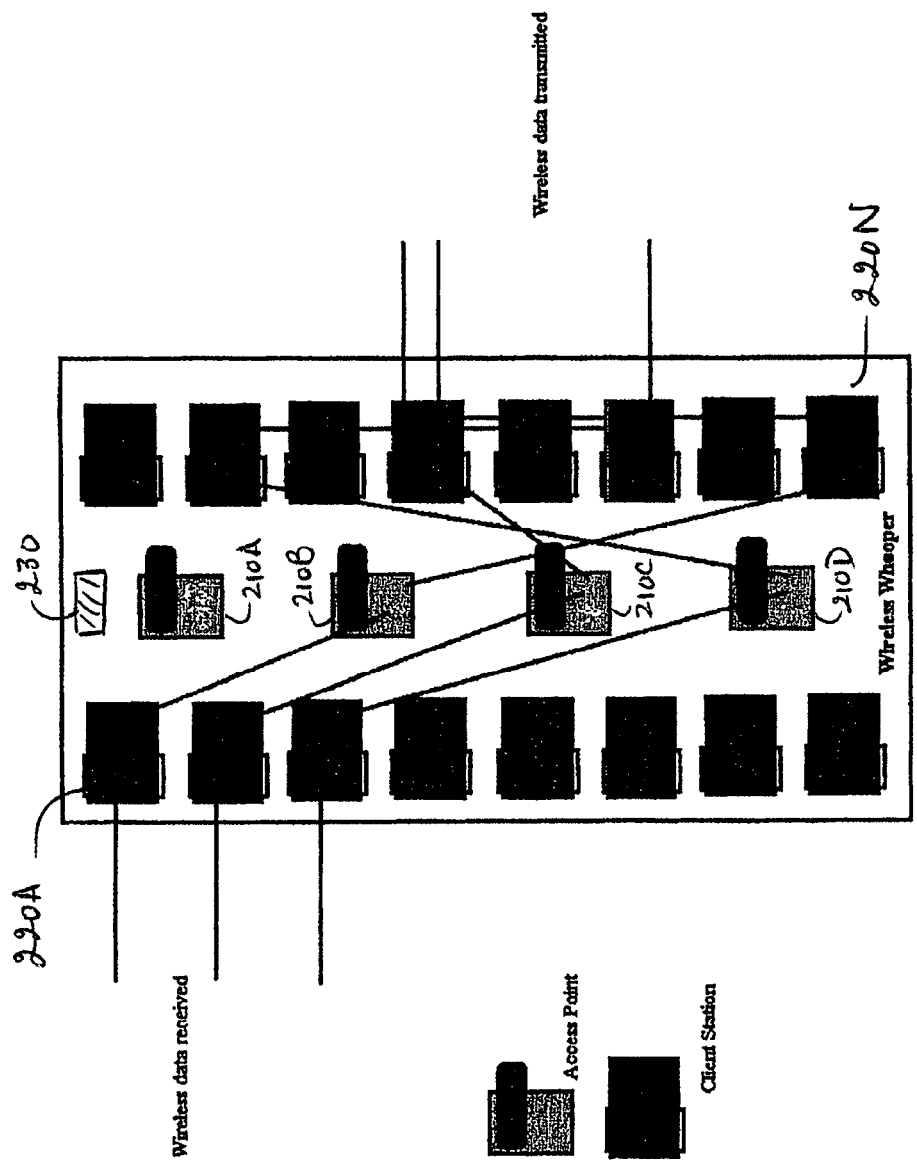
FIG. 2 illustrates an example Wireless Whooper system having a collection of wireless Access Points (APs) and client stations arranged according to a first embodiment of the present invention.

Attention now is directed to the drawings and particularly to FIG. 2, in which an example Wireless Whooper system operable in wireless networks according to an embodiment of the present invention is illustrated. As shown in FIG. 2, the Wireless Whooper system 200 includes a collection of wireless Access Points (APs) 210A-210N (where N is 4, only for purposes of simplicity) sandwiched by adjacent wireless client stations 220A-220N (where N is 16, again for purposes of simplicity) that are systemized to receive, dynamically switch between available wireless APs 210A-210N, forward and transmit streams of information through the wireless networks. Wireless APs 210A-210N and client stations 220A-220N can be commercially available, off-the-shelf products manufactured by the same manufacturer or different manufacturers, such as Cisco, Tellus Group Co., Hewlett-Packard, D-Link and Broadcom. In addition to the wireless APs 210A-210N and client stations 220A-220N, a supervisory processing unit (SPU) 230 is also provided with wireless quality of service (QoS) differentiation and traffic forwarding mechanisms (not shown) to oversee all quality of service (QoS) traffic differentiation, dynamic switching and traffic forwarding between available wireless APs 210A-210N within the Wireless Whopper system 200. Such a supervisory processing unit (SPU) 230 can be installed as a separate control device or installed on board of each of the wireless APs 210A-210N to handle the dynamic switching and routing of wireless streams of information between available wireless APs 210A-210N.

Figure 1:
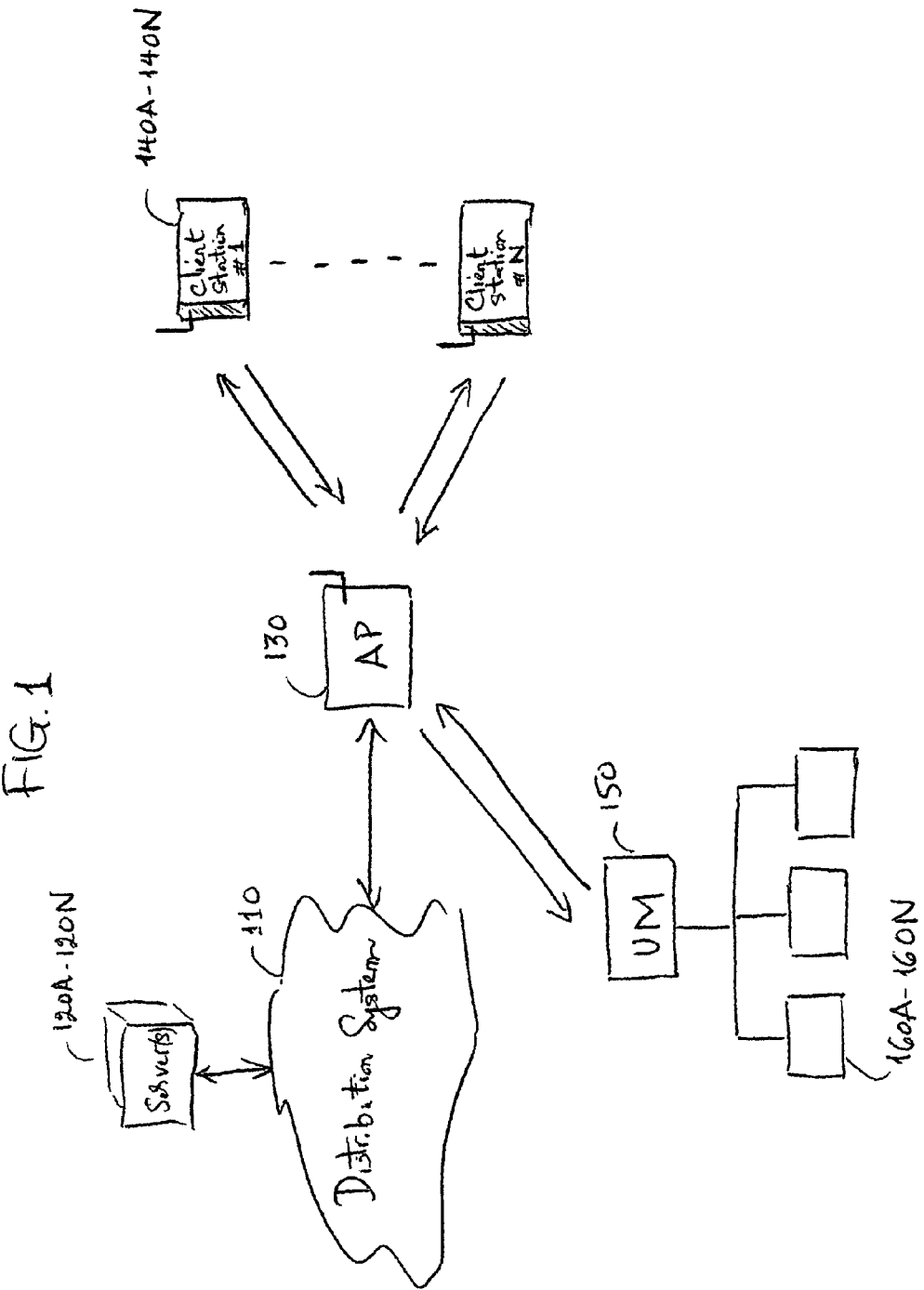
FIG. 1 illustrates existing wireless networks including a distribution system, one or more wireless Access Points (APs), each supporting a plurality of client stations.

Conceptually, such a Wireless Whooper system 200 serves as a "Super Router" provided with its own processing capabilities to establish wireless links with different wireless networks, connect different wireless networks to the distribution system 110, as shown in FIG. 1, and provide a complete routing and forwarding engine for controlling and forwarding traffic between all APs 210A-210N and client stations 220A-220N, as shown, for example in FIG. 3 between wireless networks. As a result, the Wireless Whooper system 200 can take control of the wireless communications for all information received by any of its wireless elements (i.e., wireless APs 210A-210N and client stations 220A-220N) and take control of how to buffer, prioritize, and forward the wireless information to the external world. The external world can be, for example, other wireless networks, another set of Wireless Whooper systems, or boundaries of the Internet, via the distribution system 110, as shown in FIG. 1. In addition, one or more Wireless Whooper systems 200 can be installed to be internal to multi-node (multi Whooper) networks, or at the edge of a multi-node network.

All wireless APs 210A-210N and client stations 220A-220N can be configured to operate in both an Ad-Hoc mode and an Infrastructure mode. In the Ad-Hoc mode of operation, client stations 220A-220N can be brought together to form a wireless network "on the fly" without the need of one or more wireless APs 210A-210N. There is no infrastructure or structure to the wireless network. Usually, one or more wireless client stations 220A-220N can exchange bi-directional traffic between each one and all others. In contrast to the Ad-Hoc Mode, the Infrastructure mode of operation utilizes wireless APs 210A-210N with which the client stations 220A-220N can communicate. As previously discussed, wireless APs 210A-210N are fixed network access points that are connected to the distribution system 110, as shown in FIG. 1, to widen the wireless networks' capabilities. If service areas overlap, handoffs can occur seamlessly in the way that is similar to the present day cellular networks around the world.

In addition, the wireless APs 210A-210N and client stations 220A-220N can also take a variety of shapes and include numerous configurations in both the Infrastructure mode and the Ad-Hoc mode of operation. Similarly, distributions of the wireless streams in such a Wireless Whooper system 200 can be endless. Wireless streams inside the Wireless Whooper system 200 can be distributed between multiple endpoints, i.e., wireless APs 210A-210N, wireless client stations 220A-220N, or any multiple combinations of each type or both. Such traffic distributions can also be, for example, unidirectional, partially meshed, unidirectional fully meshed, bi-directional partially meshed or bi-directionally fully meshed in both the Infrastructure mode and the Ad-Hoc mode of operation. The partially meshed configuration can be referred to as Star-Meshed configuration where wireless client stations 220A-220N can send and receive wireless information to and from a wireless AP 210. In the fully-Meshed configuration, all wireless APs 210A-210N and wireless client stations 220A-220N send and receive wireless information to and from each other. Due to the numerous combinations of wireless APs and wireless client stations, examples of partially meshed and fully-meshed configurations will be limited to traffic distributions between a single wireless AP and a group of wireless client stations, or between a group of wireless client stations, as shown and described in connection with FIGS. 4A-4B, FIGS. 5A-5B, and FIG. 6 herein below.

Figure 4A:
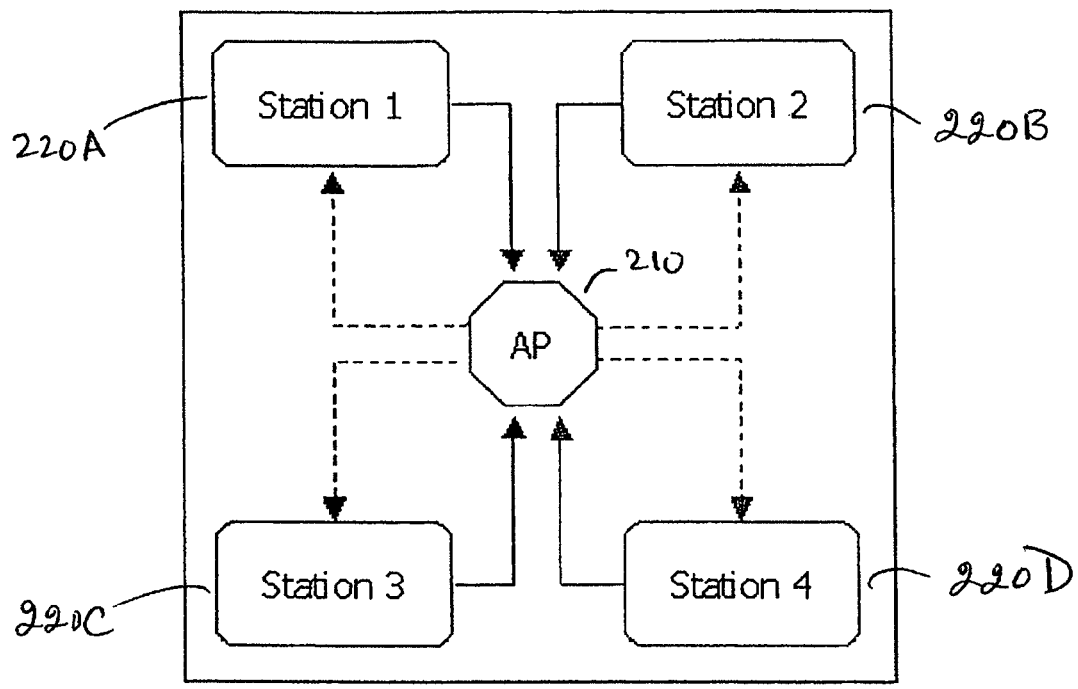
FIGS. 4A-4B illustrate example subsets of a single Access Point (AP) supporting client stations arranged in an example Star Meshed configuration to operate in an Infrastructure mode according to an embodiment of the present invention.
Figure 4B:
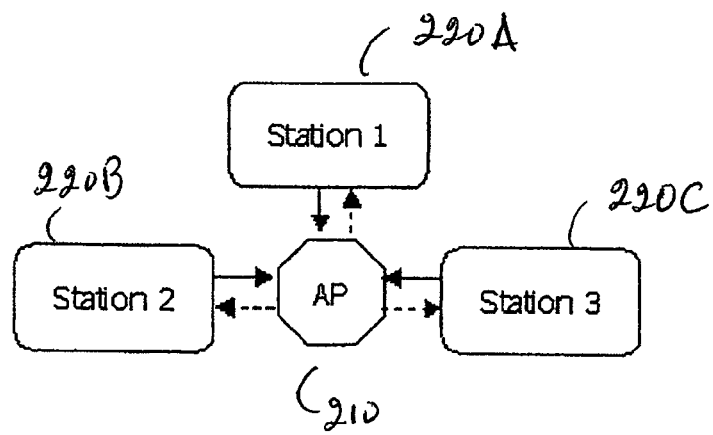

Specifically, FIGS. 4A-4B illustrate example subsets of a single Access Point (AP) supporting client stations arranged in an example Star Meshed configuration to operate in an Infrastructure mode according to an embodiment of the present invention. As shown in FIG. 4A, a single AP 210 is arranged in a Star Meshed configuration to support four (4) client stations 220A-220N within a service coverage area for operation in an Infrastructure mode. As shown in FIG. 4B, a single AP 210 is arranged in a Star Meshed configuration to support three (3) client stations 220A-220C within a service coverage area for operation in an Infrastructure mode. In the Infrastructure mode and Star Meshed configuration, the wireless AP 210 can exchange bi-directional traffic with one or more client stations 220A-220D. However, the client stations 220A-220N cannot exchange traffic among each other.

Figure 5A:
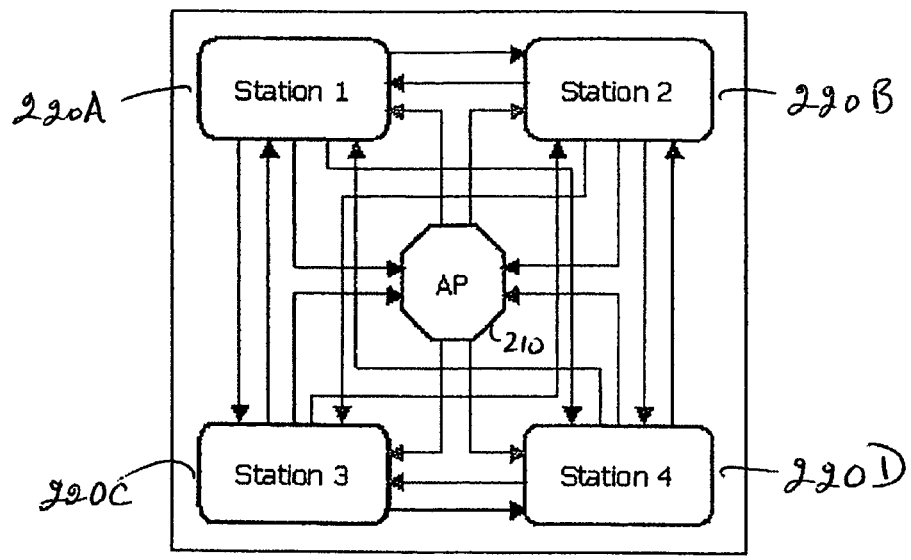
FIGS. 5A-5B illustrate example subsets of a single Access Point (AP) supporting client stations arranged in an example fully Meshed configuration to operate in an Infrastructure mode according to an embodiment of the present invention.
Figure 5B:
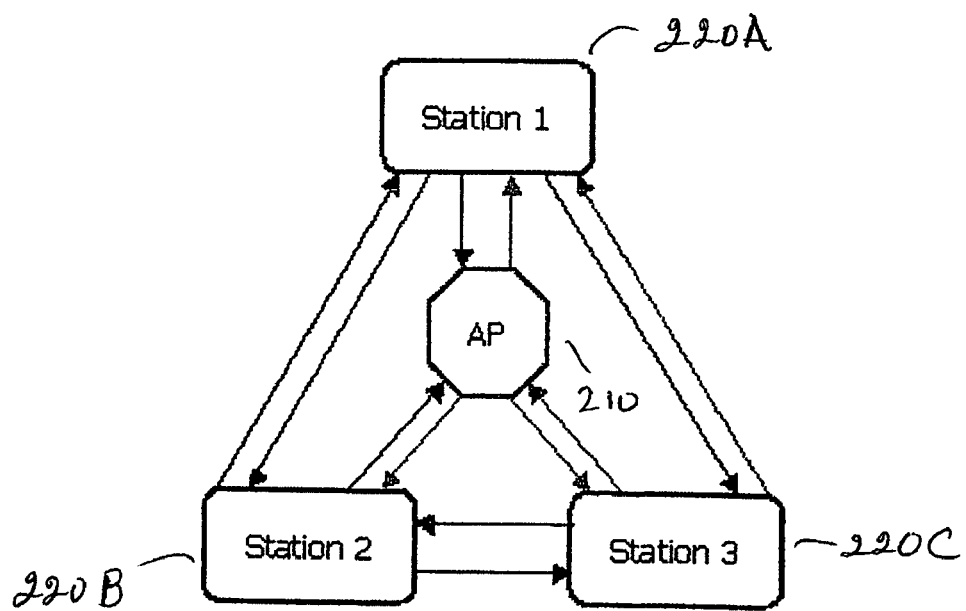
Figure 6:
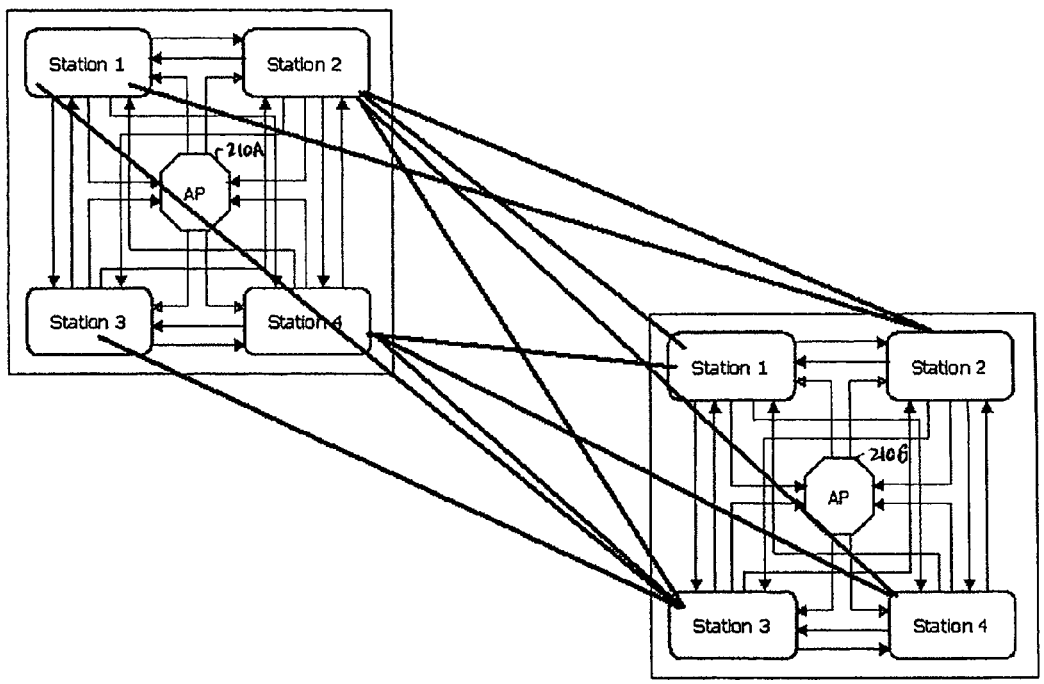
FIG. 6 illustrates an example interaction between wireless Access Points (APs) and different groups of client stations in an example Wireless Whooper system shown in FIG. 2.

FIGS. 5A-5B illustrate example subsets of a single Access Point (AP) supporting client stations arranged in an example fully Meshed configuration to operate in an Infrastructure mode according to an embodiment of the present invention. As shown in FIG. 5A, a single AP 210 is arranged in a Fully Meshed configuration to support four (4) client stations 220A-220N within a service coverage area for operation in an Infrastructure mode. As shown in FIG. 5B, a single AP 210 is arranged in a Fully Meshed configuration to support three (3) client stations 220A-220C within a service coverage area for operation in an Infrastructure mode. In the Infrastructure mode and Fully Meshed configuration, the wireless AP 210 can exchange bi-directional traffic with one or more client stations 220A-220D. In addition, the client stations 220A-220D can also exchange and forward wireless traffic among each other. The wireless client stations 220A-220DN engaged in these fully meshed forwarding distributions are also capable of forwarding traffic to other client stations, such as client stations 220E-220H, inside the Wireless Whooper system 200, as shown, for example, in FIG. 6.

Figure 7:
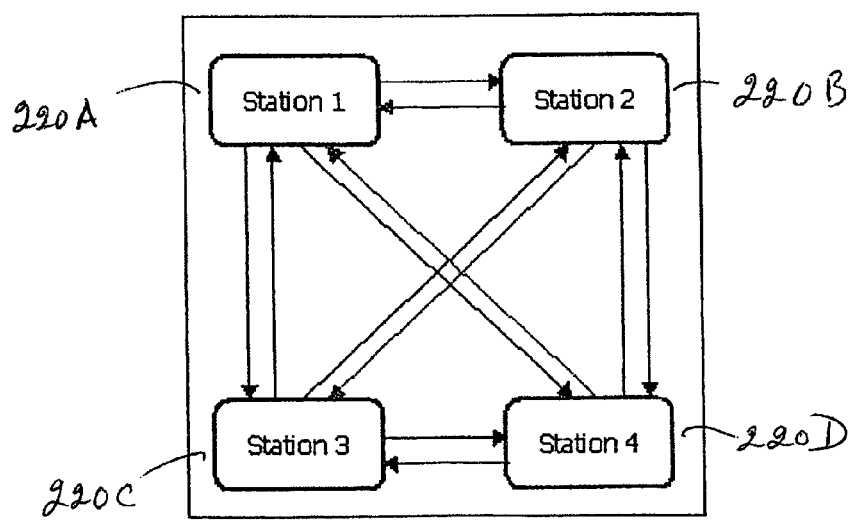
FIG. 7 illustrates an example subset of a single Access Point (AP) supporting client stations arranged in an example fully Meshed configuration to operate in an Ad-Hoc mode according to an embodiment of the present invention.

FIG. 7 illustrates an example subset of a single Access Point (AP) supporting client stations arranged in an example fully Meshed configuration to operate in an Ad-Hoc mode according to an embodiment of the present invention. In the Ad-Hoc mode and Fully Meshed configuration, one or more wireless client stations 220A-220D can exchange bi-directional traffic between each one and all others, but not with the wireless AP. In addition, the client stations 220A-220D can also forwarding the wireless traffic to other client stations (not shown) inside the Wireless Whooper system 200.

Referring back to FIG. 2, the Wireless Whooper system 200 can dynamically allocate and withdraw client stations 220A-220N that receive the wireless information, set priorities and privileges on what data streams to be transmitted and at what order to and from specific sources and destinations based on differentiated services. The Wireless Whooper system 200 also provides controllable roaming mechanisms between a particular wireless client station that has traffic to be forwarded to the next wireless hop, that is, another service coverage area. The Wireless Whooper system 200 can check available bandwidths, nearest wireless hop among other factors based on traffic priority and direct the roaming. Conversely, the Wireless Whooper system 200 can also provide a wireless AP that allows mobile wireless client stations from the external world to roam into the service coverage area, seeking service to allow their communications to the external world, via other Wireless Whooper systems. In addition, the Wireless Whooper system 200 also provides fading control and re-association for wireless nodes (i.e., client stations 220A-220N).

The Wireless Whooper system 200 can receive wireless data streams from different wireless networks and forward the wireless data streams based on different categories of importance. Such data streams can represent data traffic of different priorities or of no priority at all. Data traffic can be voice, video, data, e-mail etc, and each can have different priorities or no priority. For example, voice traffic may be set at a priority higher than a video traffic. Similarly, data traffic may be set at a higher priority than an-email traffic. Typically, the priority of each traffic stream determines which stream to be forwarded and in what order.

For priority data, the Wireless Whooper system 200 queues the data according to each stream priority level that is extracted by the supervisory processing unit (SPU) 230. The Wireless Whooper system 200 may assign the wireless network nodes (i.e., wireless APs 210A-210N and client stations 220A-220N) that will forward the priority traffic based on the intermittent or final destination as applicable.

Traffic of no priority may be buffered for in-turn forwarding whenever there is bandwidth or be dropped in case of no bandwidth available for certain time that is controlled by the supervisory processing unit (SPU) 230.

The Wireless Whooper system 200 can forward priority traffic according to the following criteria:
  (1) Priority and QoS flags
  (2) Time in queue
  (3) Throughput
  (4) Latency at Throughput values
  (5) Relative hops based on current transfer point and final destination
  (6) Handoff/Roaming to the most available wireless node (i.e., wireless APs 210A-210N and client stations 220A-220N) as controlled by the Wireless Whooper system 200.

As a result, such a Wireless Whooper system 200 advantageously provides superior wireless quality of services (QoS) differentiation and traffic forwarding mechanisms, while maintaining its cost effectiveness relative to commercially available class routers.

Turning now to the wireless quality of service (QoS) differentiation and traffic forwarding mechanisms of the Wireless Whooper system 200, as shown in FIGS. 8A-8D, an example QoS Differentiating Routing Engine installed at each wireless Access Point (AP) or supervisory processing unit (SPU) for differentiating different types of wireless streams (traffic) according to an embodiment of the present invention is illustrated. As previously discussed, the supervisory processing unit (SPU) 230 can be integrated into each wireless AP or installed as a separate control device or in a mainframe separate from the wireless APs for controlling the dynamic switching and routing of streams of information between available wireless APs 210A-210N. The QoS Differentiating Routing Engine contains a combination of time-in-queue differentiator 810 and prioritizer 820 configured to receive wireless data streams from different wireless networks or from different sources within the Wireless Whooper system 200, and route differentiated traffic based on different methods based on: (1) predefined priorities or the traffic type such as voice, video, data, email etc., and (2) the time in the buffering queue, i.e., an elapsed time in an internal queue which will determine the priority of the traffic streams and, consequently, the order of forwarding the traffic streams.

FIGS. 8A-8D illustrate example different routing outcome of four (4) different wireless streams of different types: voice, video, data and email when routed using two different methods based on their predefined priorities and the time in the buffering queue. Specifically, FIGS. 8A-8B illustrate the routing outcome based on an arrangement of the prioritizer 810 and then the time-in-queue differentiator 820 for prioritizing and differentiating different types of wireless streams (traffic) according to an embodiment of the present invention. As shown in FIG. 8A, the prioritizer 820 can be configured to receive and process wireless streams of different types and prioritize these wireless streams in accordance with their predefined priorities, such as voice (priority #1), video (priority #2), data (priority #3) and email (priority #4). These streams are then fed into the time-in-queue differentiator 820, as shown in FIG. 8B, where the four (4) streams will be forwarded with the video first, the email second, the voice third and the data last. Alternatively, FIGS. 8C-8D illustrate the routing outcome based on an arrangement of the time-in-queue differentiator 820 and then the prioritizer 810 for differentiating and prioritizing different types of wireless streams (traffic) according to an embodiment of the present invention. As shown in FIG. 8C, the time-in-queue differentiator 820 can be configured to receive and differentiate wireless streams of different types, which are then fed into the prioritizer 810, as shown in FIG. 8D, where the four (4) streams will be forwarded with the video first, the email second, the voice third and the data last.

Figure 9:
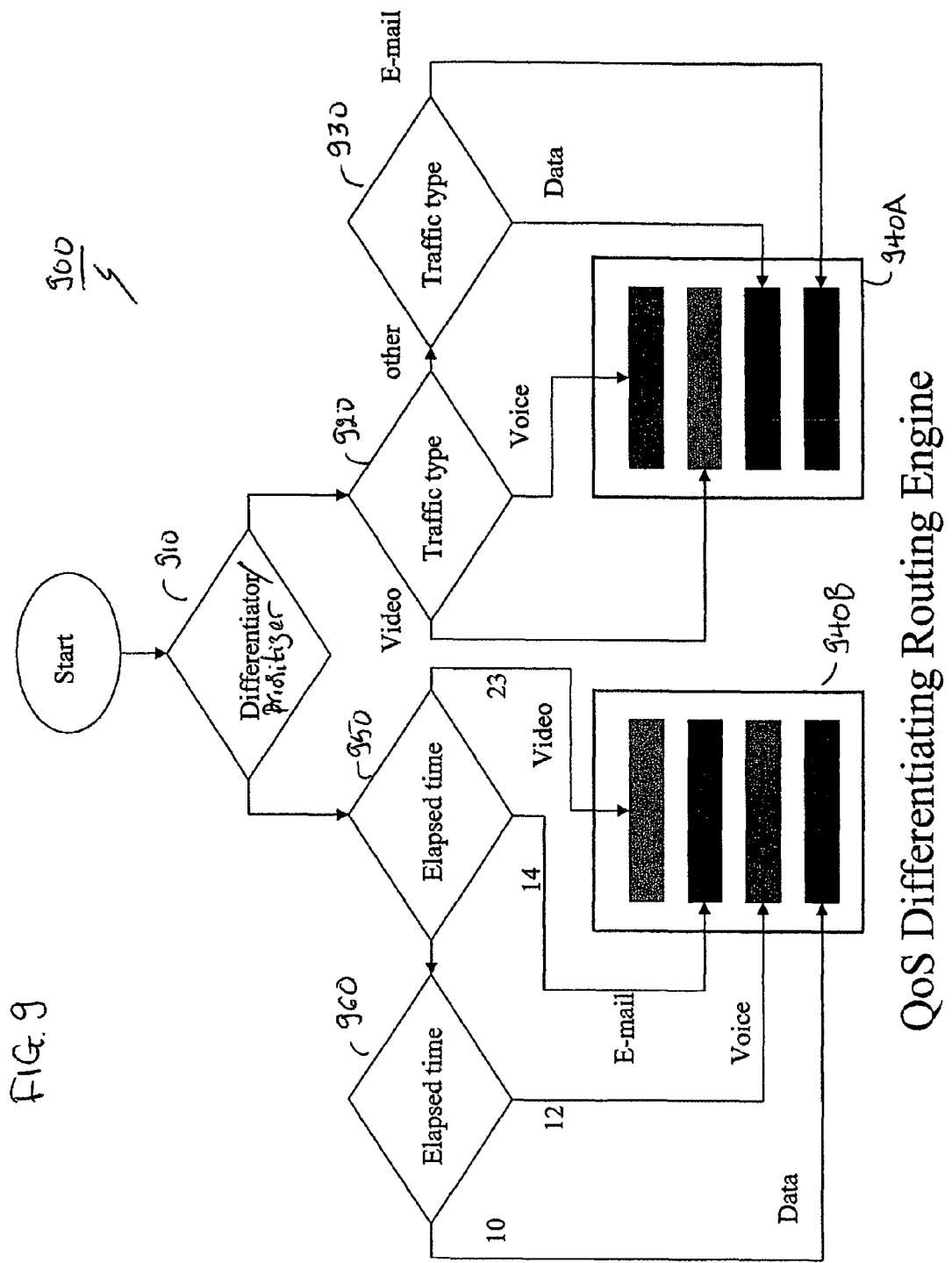
FIG. 9 illustrates an example QoS Differentiating Routing Engine installed at each wireless Access Point (AP) or Supervisory processing unit (SPU) for differentiating different types of wireless streams (traffic) according to an embodiment of the present invention.

FIG. 9 illustrates an example QoS Differentiating Routing Engine installed at each wireless Access Point (AP) or Supervisory processing unit (SPU) for differentiating different types of wireless streams (traffic) according to an embodiment of the present invention. As shown in FIG. 9, depending upon the order arrangement as discussed with reference to FIGS. 8A-8D, the Routing Engine 900 (i.e., differentiator/prioritizer) at block 910 will route differentiated traffic based on different categories that include (1) the traffic type such as voice, video, data and email; and (2) an elapse time in the queue.

The traffic stream may be received and buffered before being routed into the external routing pools based on its type. Different types have predefined priorities on which the routing decisions are made. For instance, voice traffic may be set at a priority higher than a video traffic, and data traffic may be set at a higher priority than an e-mail traffic. The input buffers are scanned and the type of each traffic stream waiting to be forwarded to the next hop is determined along with its predefined priority. The priority of each traffic stream will determine which stream to be forwarded and in what order.

The elapsed time in the queue will determine the priority of the traffic streams and consequently the order of forwarding them. The longer a traffic stream in the queue the higher priority the traffic stream gets and consequently the sooner such a traffic stream will be forwarded.

For example, at block 920 and block 930, the Routing Engine 900 determines the traffic type of an incoming traffic stream. If the incoming traffic stream is a voice traffic, the voice traffic may set at a highest priority, as shown in an external routing pool 940A. If the incoming traffic stream is a video traffic, the video traffic may be set at a next highest priority in the external routing pool 940A. If the incoming traffic stream is a data traffic, the data traffic may be set at a priority lower than a video traffic, in the external routing pool 940A. Lastly, if the incoming traffic stream is an email traffic, the email traffic may be set at a lowest priority, as shown in the external routing pool 940A.

In addition, the Routing Engine 900 also determines an elapsed time in the queue of an incoming traffic stream at block 950 and block 960. If the incoming video stream sits in the queue longest, for example, at 23 ns, then the video stream is set at a highest priority, as shown in an external routing pool 940B. If the incoming email stream sets in the queue next longest, for example, at 14 ns, the email traffic may be set at a next highest priority in the external routing pool 940B. If the incoming voice stream sits in the queue next to the email traffic, for example, at 12 ns, the voice traffic may be set at a priority lower than an email traffic, in the external routing pool 940B. Lastly, if the incoming data stream sits in the queue for the shortest amount of time, for example, at 10 ns, the data traffic may be set at a lowest priority, as shown in the external routing pool 940B.

Figure 10:
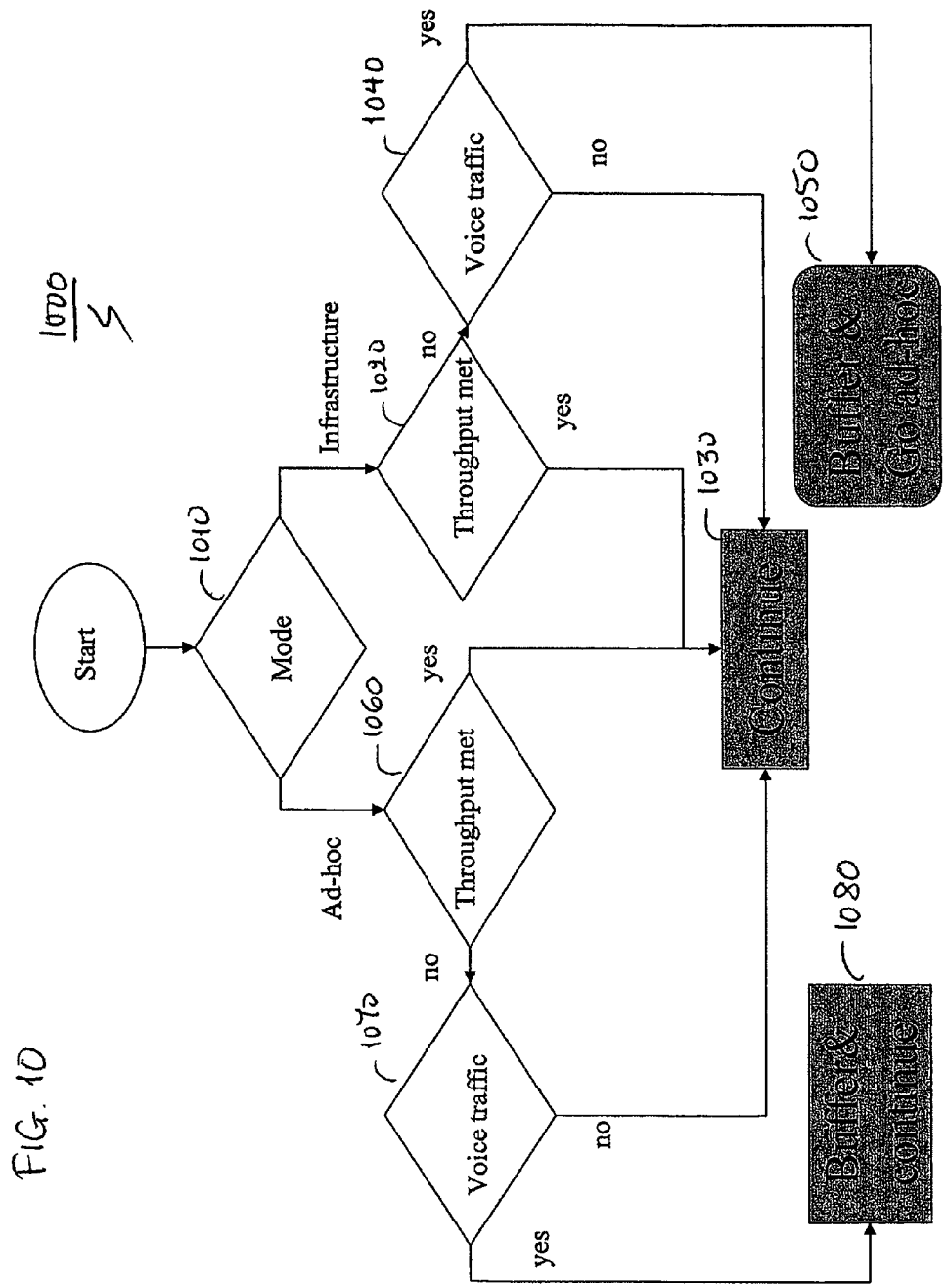
FIG. 10 illustrates an example switching between an Infrastructure mode of operation and an Ad-Hoc mode of operation according to an embodiment of the present invention.

In addition to the QoS Differentiating Routing Engine installed at each wireless Access Point (AP) or Supervisory processing unit (SPU), each of the wireless Access Points (APs) 210A-210N and client stations 220A-220N can also be configured to switch between an Infrastructure mode of operation and an Ad-Hoc mode of operation seamlessly. In particular, intelligence in terms of software, hardware or firmware can be incorporated into a wireless card installed in each of the wireless Access Points (APs) 210A-210N and client stations 220A-220N to control the dynamic switching between an Infrastructure mode and an Ad-Hoc mode of operation. FIG. 10 illustrates an example switching between an Infrastructure mode of operation and an Ad-Hoc mode of operation according to an embodiment of the present invention. A mode of operation is required between an Infrastructure mode and an Ad-Hoc mode depending upon whether wireless client stations 220A-220N communicate among themselves, or via corresponding wireless APs 210A-210N, as described, for example, in connection with FIGS. 4A-4B, FIGS. 5A-5B, FIG. 6 and FIG. 7. Such a mode of operation can be dynamically changed or switched between an Infrastructure mode and an Ad-Hoc mode.

As shown in FIG. 10, the mode of operation of a wireless element (i.e., a wireless AP or a wireless client station) is checked for an Infrastructure mode or an Ad-Hoc mode, at block 1010. If the wireless element (i.e., a wireless AP or a wireless client station) operates in an Infrastructure mode, the throughput value is checked against a desired value that is associated with the traffic stream at block 1020. If the throughput value is met, the wireless element (i.e., a wireless AP or a wireless client station) proceeds to continue other tasks, such as differentiated wireless services at block 1030. If the throughput value is not met, the type of traffic is checked at block 1040. If the traffic type is a differentiated service traffic such as voice, then the supervisory processing unit (SPU) 230 of the Wireless Whooper system 200 will direct the traffic to be buffered and switch the mode of operation to an Ad-Hoc mode at block 1050. This implies adding to the network segment another wireless traffic client that handles the buffering process. Otherwise, the wireless element (i.e., a wireless AP or a wireless client station) proceeds to continue other tasks, at block 1030.

On the other hand, if the wireless element (i.e., a wireless AP or a wireless client station) operates in an Ad-Hoc mode, the throughput value is checked against a desired value that is associated with the traffic stream at block 1060. If the throughput value is met, the wireless element (i.e., a wireless AP or a wireless client station) proceeds to continue other tasks, such as differentiated wireless services at block 1030. However, if the throughput value is not met, the type of traffic is checked at block 1070. If the traffic type is a differentiated service traffic such as voice, then the supervisory processing unit (SPU) 230 of the Wireless Whooper system 200 will direct the traffic to be buffered and continue accordingly at block 1080. Otherwise, the wireless element (i.e., a wireless AP or a wireless client station) proceeds to continue other tasks, at block 1030.

Figure 11:
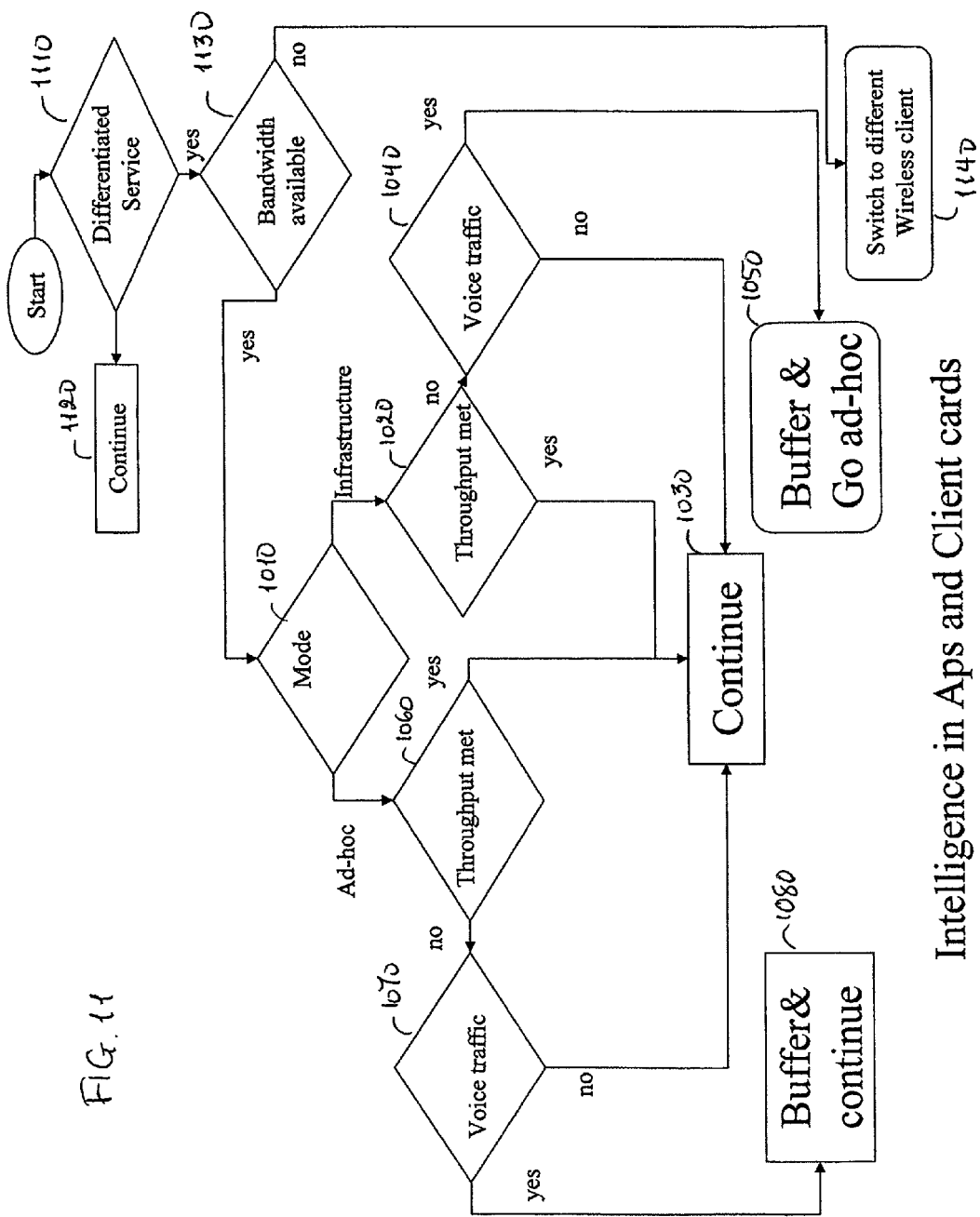
FIG. 11 illustrates an example flowchart of differentiating different types of wireless streams (traffic) according to an embodiment of the present invention.

FIG. 11 illustrates an example flowchart of differentiating different types of wireless streams (traffic) according to another embodiment of the present invention. In addition to the switching between an Infrastructure mode of operation and an Ad-Hoc mode of operation, as shown in FIG. 10, the wireless element (i.e., a wireless AP or a wireless client station) also determines if the service has been differentiated at block 1110. Differentiated service can be characterized, for example, by the QoS Differentiating Routing Engine, shown in FIG. 9. If the service has not been differentiated, the wireless element (i.e., a wireless AP or a wireless client station) proceeds to continue other tasks, at block 1120. However, if the service has been differentiated, the wireless element (i.e., a wireless AP or a wireless client station) will determine if bandwidth is available to serve the differentiated service at block 1130. If the bandwidth is not available, then the wireless element (i.e., a wireless AP or a wireless client station) will switch to a different wireless element element (i.e., a wireless AP or a wireless client station) with sufficient bandwidth to service the request at block 1140. However, if the bandwidth is available, then the wireless element (i.e., a wireless AP or a wireless client station) will proceed to determine the mode of operation at block 1010 in the same manner as described in connection with FIG. 10, that is, checking if a wireless element (i.e., a wireless AP or a wireless client station) operates in an Infrastructure mode or an Ad-Hoc mode, at block 1010.

If the wireless element (i.e., a wireless AP or a wireless client station) operates in an Infrastructure mode, the throughput value is checked against a desired value that is associated with the traffic stream at block 1020. If the throughput value is met, the wireless element (i.e., a wireless AP or a wireless client station) proceeds to continue other tasks, such as differentiated wireless services at block 1030. If the throughput value is not met, the type of traffic is checked at block 1040. If the traffic type is a differentiated service traffic such as voice, then the supervisory processing unit (SPU) 230 of the Wireless Whooper system 200 will direct the traffic to be buffered and switch the mode of operation to an Ad-Hoc mode at block 1050. On the other hand, if the wireless element (i.e., a wireless AP or a wireless client station) operates in an Ad-Hoc mode, the throughput value is checked against a desired value that is associated with the traffic stream at block 1060. If the throughput value is met, the wireless element (i.e., a wireless AP or a wireless client station) proceeds to continue other tasks, such as differentiated wireless services at block 1030. However, if the throughput value is not met, the type of traffic is checked at block 1070. If the traffic type is a differentiated service traffic such as voice, then the supervisory processing unit (SPU) 230 of the Wireless Whooper system 200 will direct the traffic to be buffered and continue accordingly at block 1080. Otherwise, the wireless element (i.e., a wireless AP or a wireless client station) proceeds to continue other tasks, at block 1030.

Returning now to FIG. 2, the Wireless Whooper system 200 can be implemented in several ways. For example, if the Wireless Whooper system 200 is to be installed at a public space, such as, a hotel having five (5) floors with each floor having four (4) rooms, then a 1st wireless AP 210A can be installed on 1st floor to support four (4) wireless client stations 220A-220D in respective rooms. Similarly, a 2nd wireless AP 210B can be installed on 2nd floor to support four (4) wireless client stations 220E-220H in respective rooms. A 3rd wireless AP 210C can be installed on 3rd floor to support four (4) wireless client stations 220I-220L in respective rooms. A 4th wireless AP 210N can be installed on 4th floor to support four (4) wireless client stations 220M-220P in respective rooms. The supervisory processing unit (SPU) 230 can be integrated into each of the wireless APs 210A-210N for providing dynamic switching and routing of streams of information between available wireless APs 210A-210N all within a wireless coverage area. As arranged in the manner shown in FIG. 2, all wireless client stations on a 1st floor are supported and wirelessly linked to the wireless AP on the 1st floor. Likewise, all wireless client stations on a 2nd floor are supported and wirelessly linked to the wireless AP on the 2nd floor. Likewise, all wireless client stations on a 3rd floor are supported and wirelessly linked to the wireless AP on the 3rd floor.

However, if a particular client station, for example, client station 220I on the 3rd floor requests for services such as voice over IP (VoIP) which has high priority over video, data or email, but the corresponding wireless AP 210C on the 3rd floor is busy processing all other requests from all other client stations on the same floor, or lacks sufficient bandwidth to process the VoIP request from that particular client station, then the Wireless Whooper system 200, in particular, the supervisory processing unit (SPU) 230 can intelligently determine the next available wireless AP with sufficient bandwidth within the Wireless Whooper system 200 and automatically forward the VoIP request to the next available wireless AP, for example, wireless AP 210N on the 4th floor to process the VoIP request immediately without interruption or delay. In addition, the Wireless Whooper system 200 can also dynamically change a single wireless traffic stream between any single source and destination to multiple streams via other existing wireless elements.

Figure 12:
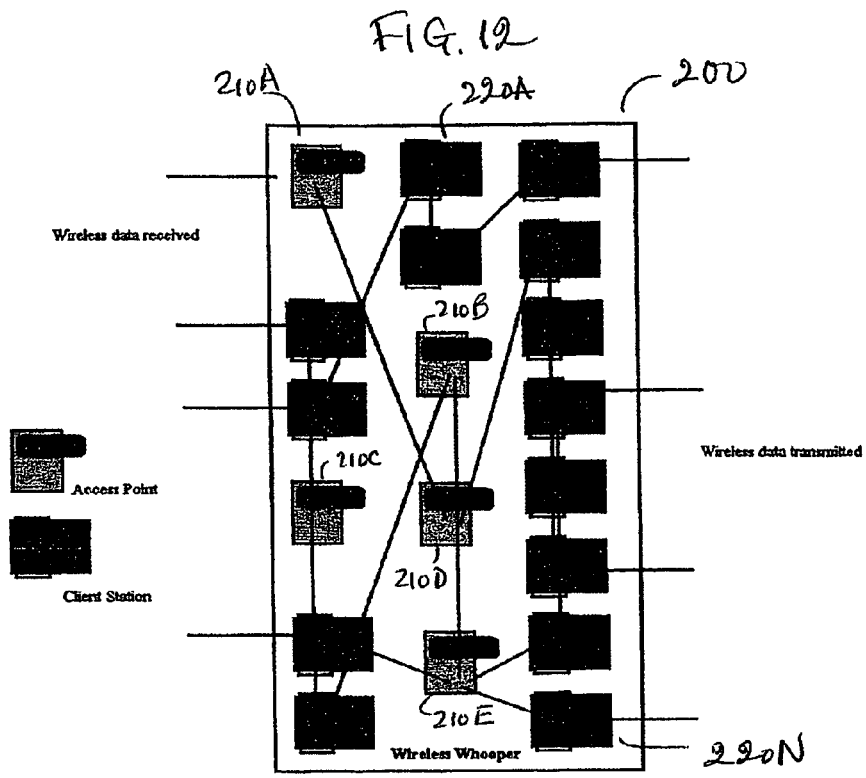
FIG. 12 illustrates an example Wireless Whooper system having a collection of wireless Access Points (APs) and client stations arranged according to another embodiment of the present invention.

Turning now to FIG. 12, FIG. 13 and FIG. 14, different example Wireless Whooper systems having a collection of wireless APs and client stations in different arrangements depending upon physically limitations of an operating site are illustrated. Specifically, FIG. 12 illustrates an example Wireless Whooper system having a collection of wireless Access Points (APs) and client stations arranged according to another embodiment of the present invention. As shown in FIG. 12, for purposes of simplicity, a wireless AP 210A, 210B and 210E can be arranged at the center or at the edge of each floor. In addition, one or more wireless APs, such as wireless APs 210C and 210D, can be installed in series on the same floor for providing greater bandwidth capacities. FIG. 13 illustrates an example Wireless Whooper system having a collection of wireless Access Points (APs) and client stations arranged according to yet another embodiment of the present invention. As shown in FIG. 13, multiple wireless APs, such as wireless APs 210A-210D, may be arranged on a 1st floor to support a single wireless client station 220A. Similarly, wireless APs 210E-210H may be arranged on a 2nd floor to support a single wireless client station 220B. Likewise, wireless APs 210M-210P may be arranged on a 4th floor to support a single wireless client stations 220D. Different wireless APs may have different capacity and bandwidth to best process a different type of messages. Such an arrangement may be necessary for buffering and relaying messages, particularly, in a mass event where a few wireless APs may not provide high bandwidth capacities to few wireless client stations.

FIG. 14 illustrates an example arrangement of multiple Wireless Whooper systems 200A-200N in which each Wireless Whooper system is provided with a collection of wireless Access Points (APs) and client stations arranged in the same or different configurations. As long as a wireless client station is provided with the ability to roam in different Wireless Whooper systems 200A-200N, multiple Wireless Whooper systems 200A-200N may be necessary to handle a heavy volume of calls or requests and provide additional bandwidth usable for many users, particularly, in a sport event.

Various components of the Wireless Whooper system 200, such as the QoS Differentiating Routing Engine 900 as shown in FIG. 8 and FIGS. 9A-9D and the switching between an Infrastructure mode and an Ad-Hoc mode, as shown in FIG. 10 and FIG. 11, can be implemented in software or hardware, such as, for example, an application specific integrated circuit (ASIC) or printed circuit board (PCB). As such, it is intended that the processes described herein be broadly interpreted as being equivalently performed by software, hardware, or a combination thereof. Software modules can be written, via a variety of software languages, including C, C++, Java, Visual Basic, and many others. The various software modules may also be integrated in a single application executed on various types of wireless cards, such as PCMCIA cards, PCI cards, USB card shown in FIG. 15. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

As described from the foregoing, the present invention advantageously provides a Wireless Whooper system which consolidates a plurality of wireless Access Points (APs) and client stations arranged in various configurations to provide high quality differentiated wireless services and capabilities to dynamically change a single wireless traffic stream between any single source and destination to multiple streams via other existing wireless elements (e.g., wireless Access Points "APs" and client stations), while utilizing all functionalities offered by wireless Access Points (APs) and client stations.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the components of the Wireless Whooper system, such as the QoS Differentiating Routing Engine 900 as shown in FIG. 8 and FIGS. 9A-9D and the switching between an Infrastructure mode and an Ad-Hoc mode, as shown in FIG. 10 and FIG. 11, can be implemented in a single hardware or firmware stalled at an existing wireless card to perform the functions as described. In addition, the wireless network has been described in the context of a wireless network having an architecture typical of North America, it should be appreciated that the present invention is not limited to this particular wireless network or protocol. Rather, the invention is applicable to other wireless networks and compatible communication protocols. Moreover, a remote control system can also be set up at a laboratory, research center or testing center to connect to the network, such as the Internet, as shown in FIG. 2, in order to access the wireless Access Point "AP", via a gateway (not shown), and control all functionalities of the Wireless Whooper system 200. In addition, client stations 220A-220N can also be mobile stations, such as phones or Personal Digital Assistants (PDAs), all of which can also be controlled at the laboratory, research center or testing center, via the wireless network. Furthermore, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, both the software modules as described in connection with FIGS. 8-11 can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Lastly, the Wireless Whooper system can also be implemented in a single ASIC chip installed at a mainframe at a public space, such as airport, hotel, library etc., including multiple access node radios representing wireless APs and client stations and an internal built-in SPU for controlling the dynamic switching between wireless APs within the Wireless Whooper system. Accordingly, it is intended, therefore, that the present invention not be limited to the various example embodiments disclosed, but that the present invention includes all embodiments falling within the scope of the appended claims.

What is claimed is:

1. A Wireless Whooper system for use in wireless networks, comprising:
   a plurality of wireless client stations arranged to transmit and receive wireless streams of information;
   one or more wireless Access Points (APs) arranged to provide wireless links with the wireless client stations, each supporting a group of wireless client stations; and a supervisory processing unit (SPU) arranged to monitor and dynamically switch between available wireless APs, forward and transmit streams of information through the wireless networks;

wherein the supervisory processing unit (SPU) is configured to dynamically allocate and withdraw designated client stations that receive the wireless information, set priorities and privileges on what wireless streams of information to be transmitted and at what order to and from specific sources and destinations based on differentiated services, and is provided with controllable roaming mechanisms between a particular wireless client station that has traffic to be forwarded to a next service coverage area, and is configured to check available bandwidths, nearest wireless hop among other factors based on traffic priority and direct the roaming between different coverage areas.

2. The Wireless Whooper system as claimed in claim 1, wherein the supervisory processing unit (SPU) is provided with wireless quality of service (QoS) differentiation and traffic forwarding mechanisms to oversee all quality of service (QoS) traffic differentiation, dynamic switching and traffic forwarding between available wireless APs within the system, and is installed as a separate control device or integrated within each wireless AP to handle the dynamic switching and routing of streams of information between available wireless APs within the system.

3. The Wireless Whooper system as claimed in claim 1, wherein the wireless APs and client stations are configured to operate in an Ad-Hoc mode, where client stations exchange bi-directional traffic between each one and all others without the need of wireless APs, and to operate in an Infrastructure mode, where the client stations exchange bi-directional traffic, via the wireless APs.

4. The Wireless Whooper system as claimed in claim 3, wherein the wireless APs and client stations are arranged in various configurations, including unidirectional, partially meshed, unidirectional fully meshed, bi-directional partially meshed or bi-directionally fully meshed configurations for operation in both the Infrastructure mode and the Ad-Hoc mode.

5. The Wireless Whooper system as claimed in claim 3, wherein the wireless APs and client stations are arranged in a Star-Meshed configuration for operation in an Infrastructure mode, where designated wireless client stations send and receive wireless information to and from a single wireless AP.

6. The Wireless Whooper system as claimed in claim 3, wherein the wireless APs and client stations are arranged in a Fully-Meshed configuration for operation in both the Ad-Hoc mode and the Infrastructure mode, where wireless APs and wireless client stations send and receive wireless information to and from each other.

7. A Wireless Whooper system for use in wireless networks, comprising:

a plurality of wireless client stations arranged to transmit and receive wireless streams of information;

one or more wireless Access Points (APs) arranged to provide wireless links with the wireless client stations, each supporting a group of wireless client stations; and a supervisory processing unit (SPU) arranged to monitor and dynamically switch between available wireless APs, forward and transmit streams of information through the wireless networks;

wherein the supervisory processing unit (SPU) is further configured to forward the wireless streams of information based on different categories of importance, including: (1) Priority and QoS flags; (2) Time in queue; (3) Throughput; (4) Latency at Throughput values; (5) Relative hops based on current transfer point and final destination; and (6) Handoff/Roaming to the most available wireless APs and client stations.

8. A Wireless Whooper system for use in wireless networks, comprising:

a plurality of wireless client stations arranged to transmit and receive wireless streams of information;

one or more wireless Access Points (APs) arranged to provide wireless links with the wireless client stations, each supporting a group of wireless client stations; and a supervisory processing unit (SPU) arranged to monitor and dynamically switch between available wireless APs, forward and transmit streams of information through the wireless networks;

wherein the supervisory processing unit (SPU) is provided with a QoS Differentiating Routing Engine comprising a time-in-queue differentiator and a prioritizer configured to receive wireless streams of information from different wireless networks or from different sources within the system, and route differentiated traffic based on different methods based on: (1) predefined priorities, and (2) an elapsed time in an internal queue which determines the priority of the wireless streams information and, consequently, the order of forwarding the wireless streams of information.

9. The Wireless Whooper system as claimed in claim 8, wherein the QoS Differentiating Routing Engine is further configured to switch between an Ad-Hoc mode of operation and an Infrastructure mode of operation, depending upon whether wireless client stations communicate among themselves, or via corresponding wireless APs.

10. A Wireless Whooper system for use in wireless networks, comprising:

one or more wireless Access Points (APs) arranged in communication with a distribution system, each wireless AP supporting a group of wireless client stations to transmit and receive wireless streams of information; and a supervisory processing unit (SPU) provided in each wireless AP, to monitor and differentiate different types of wireless streams of information, to dynamically switch and forward differentiated streams of information between available wireless APs in the wireless networks;

wherein the supervisory processing unit (SPU) is configured to dynamically allocate and withdraw designated client stations that receive the wireless information, set priorities and privileges on what wireless streams of information to be transmitted and at what order to and from specific sources and destinations based on differentiated services, and is provided with controllable roaming mechanisms between a particular wireless client station that has traffic to be forwarded to a next service coverage area, and is configured to check available bandwidths, nearest wireless hop among other factors based on traffic priority and direct the roaming between different coverage areas.

11. The Wireless Whooper system as claimed in claim 10, wherein the wireless APs and client stations are configured to operate in an Ad-Hoc mode, where client stations exchange bi-directional traffic between each one and all others without the need of wireless APs, and to operate in an Infrastructure mode, where the client stations exchange bi-directional traffic, via the wireless APs.

12. The Wireless Whooper system as claimed in claim 10, wherein the wireless APs and client stations are arranged in various configurations, including unidirectional, partially meshed, unidirectional fully meshed, bi-directional partially meshed or bi-directionally fully meshed configurations for operation in both the Infrastructure mode and the Ad-Hoc mode.

13. The Wireless Whooper system as claimed in claim 10, wherein the wireless APs and client stations are arranged in a Star-Meshed configuration for operation in an Infrastructure mode, where designated wireless client stations send and receive wireless information to and from a single wireless AP.

14. The Wireless Whooper system as claimed in claim 10, wherein the wireless APs and client stations are arranged in a Fully-Meshed configuration for operation in both the Ad-Hoc mode and the Infrastructure mode, where wireless APs and wireless client stations send and receive wireless information to and from each other.

15. A Wireless Whooper system for use in wireless networks, comprising:
   one or more wireless Access Points (APs) arranged in communication with a distribution system, each wireless AP supporting a group of wireless client stations to transmit and receive wireless streams of information; and
   a supervisory processing unit (SPU) provided in each wireless AP, to monitor and differentiate different types of wireless streams of information, to dynamically switch and forward differentiated streams of information between available wireless APs in the wireless networks;
   wherein the supervisory processing unit (SPU) is further configured to forward the wireless streams of information based on different categories of importance, including: (1) Priority and QoS flags; (2) Time in queue; (3) Throughput; (4) Latency at Throughput values; (5) Relative hops based on current transfer point and final destination; and (6) Handoff/Roaming to the most available wireless APs and client stations.

16. A Wireless Whooper system for use in wireless networks, comprising:
   one or more wireless Access Points (APs) arranged in communication with a distribution system, each wireless AP supporting a group of wireless client stations to transmit and receive wireless streams of information; and
   a supervisory processing unit (SPU) provided in each wireless AP, to monitor and differentiate different types of wireless streams of information, to dynamically switch and forward differentiated streams of information between available wireless APs in the wireless networks;
   wherein the supervisory processing unit (SPU) is provided with a QoS Differentiating Routing Engine comprising a time-in-queue differentiator and a prioritizer configured to receive wireless streams of information from different wireless networks or from different sources within the system, and route differentiated traffic based on different methods based on: (1) predefined priorities, and (2) an elapsed time in an internal queue which determines the priority of the wireless streams information and, consequently, the order of forwarding the wireless streams of information; and wherein the QoS Differentiating Routing Engine is further configured to switch between an Ad-Hoc mode of operation and an Infrastructure mode of operation, depending upon whether wireless client stations communicate among themselves, or via corresponding wireless APs.

17. A non-transitory computer readable medium having stored thereon a plurality of instructions which, when executed by a wireless Access Point (AP) in a Wireless Whooper system having a collection of wireless APs and wireless client stations, cause the wireless AP to perform the steps of:
   receiving an incoming wireless stream of information from different wireless networks;
   differentiating the incoming wireless stream of information as a traffic type including voice, video, data and email; and
   routing a differentiated traffic based on different categories that include (1) predefined priorities, and (2) an elapse time in an internal queue which determines the priority of wireless streams and the order of forwarding the wireless streams of information
   wherein the predefined priorities define that a voice traffic has a highest priority, a video traffic has a next highest priority, a data traffic has a higher priority than an e-mail traffic, and the priority of each traffic type determines which wireless stream is to be forwarded to different wireless networks in a specified order.

* * * * *